(12) United States Patent
Strand

(10) Patent No.: US 7,396,433 B2
(45) Date of Patent: Jul. 8, 2008

(54) PROCESS AND ARRANGEMENT FOR SEPARATING OIL FROM OIL CONTAINING MATERIALS

(75) Inventor: Asbjørn Strand, Bønes (NO)

(73) Assignee: Thermtech AS, Paradis (NO)

( * ) Notice: Subject to any disclaimer, the term of this patent is extended or adjusted under 35 U.S.C. 154(b) by 6 days.

(21) Appl. No.: 10/477,378

(22) PCT Filed: May 16, 2002

(86) PCT No.: PCT/NO02/00178

§ 371 (c)(1),
(2), (4) Date: Feb. 12, 2004

(87) PCT Pub. No.: WO02/092187

PCT Pub. Date: Nov. 21, 2002

(65) Prior Publication Data

US 2004/0149395 A1 Aug. 5, 2004

(30) Foreign Application Priority Data

May 16, 2001 (NO) ................................. 20012402

(51) Int. Cl.
*B01D 3/38* (2006.01)
*C10G 33/00* (2006.01)
*E21B 21/06* (2006.01)
*C09K 8/03* (2006.01)
*F26B 11/12* (2006.01)

(52) U.S. Cl. ..................... 159/47.3; 159/16.3; 159/25.1; 159/DIG. 20; 175/66; 208/188; 34/498

(58) Field of Classification Search ................ 159/16.1, 159/16.3, 25.1, 47.1, 47.3, DIG. 3, DIG. 20; 175/66; 208/188; 34/498
See application file for complete search history.

(56) References Cited

U.S. PATENT DOCUMENTS 3,150,862 A * 9/1964 Grabauskas ............... 366/181.8

(Continued)

FOREIGN PATENT DOCUMENTS

EP 0 611 937 8/1994

(Continued)

OTHER PUBLICATIONS

Database WPI, Week 200232, Derwent Publications Ltd., London, GB; JP 20 02071269 A, Mar. 2002.

(Continued)

*Primary Examiner*—Virginia Manoharan
(74) *Attorney, Agent, or Firm*—Francis C. Hand; Carella, Byrne, Bain et al

(57) ABSTRACT

The process separates oil and water from a sludge mixture by directing the sludge mixture into a rapidly rotating friction dryer having a cylindrical chamber with a smooth inner surface and a rotating rotor having rotor arms extending into closely spaced relation to the inner surface of the chamber. The rotor is rapidly rotated to form an annular bed of the sludge material while moving the material particles in the mixture axially and tangentially and while frictionally generating heat between the rotor arms and the sludge material sufficient to evaporate the water in the sludge material to steam. At the same time, the oil in the mixture is heated by the steam and evaporated at a temperature below the normal atmospheric boiling point of the oil. Thereafter, the separated evaporated oil and the steam are removed from the chamber.

11 Claims, 2 Drawing Sheets

U.S. PATENT DOCUMENTS

| | | | | |
|---|---|---|---|---|
| 3,684,732 | A | * | 8/1972 | Grabauskas ................... 516/77 |
| 4,054,507 | A | * | 10/1977 | Pouska ....................... 406/197 |
| 4,101,414 | A | * | 7/1978 | Kim et al. .................... 208/18 |
| 4,208,134 | A | | 6/1980 | Whittle |
| 4,222,988 | A | * | 9/1980 | Barthel ....................... 422/309 |
| 4,400,134 | A | * | 8/1983 | Sweeney ..................... 415/62 |
| 4,422,901 | A | * | 12/1983 | Karnofsky ............... 196/14.52 |
| 4,589,215 | A | | 5/1986 | Iwasaki et al. |
| 4,623,448 | A | * | 11/1986 | O'Connell et al. .......... 588/316 |
| 5,200,066 | A | * | 4/1993 | Jorgensen ................... 210/109 |
| 5,480,566 | A | * | 1/1996 | Strand ........................ 210/772 |
| 5,915,815 | A | * | 6/1999 | Moore et al. ................... 34/305 |
| 6,004,455 | A | * | 12/1999 | Rendall ....................... 208/390 |
| 6,120,650 | A | * | 9/2000 | Nye et al. ................... 196/116 |

FOREIGN PATENT DOCUMENTS

WO     WO 95/18946     7/1995

OTHER PUBLICATIONS

L.F. Fieser, 3$^{rd}$ Edition, "Experiments in Organic Chemistry",1955, pp. 56-60.

* cited by examiner

PROCESS AND ARRANGEMENT FOR SEPARATING OIL FROM OIL CONTAINING MATERIALS

The present invention relates to a process for separation of oil from oil-containing materials, and means for the same.

Thus, the present invention relates to drying of different types of oil-containing sludge. The material on which tests have been carried out is cuttings and therefore the description given below will focus on this material. However, it must be pointed out that the invention is not limited to drying of cuttings.

In connection with oil exploration, large amounts of oil-based drilling sludge are used. Use of oil-based drilling sludge, as opposed to water-based drilling sludge, leads to considerable technical advantages in test drilling as well as production drilling of oil wells both from land and off-shore based drilling operations.

Typically, the cuttings consist of granulated stone and clay which have been brought up from the ground with the aid of drilling fluids (mud) and remains of drilling fluids which the mechanical separation methods that are used in connection with the drilling operations do not manage to remove. Drilling sludge consists of special base oils, water, various chemicals and special types of finely ground clay. Very large amounts of this type of waste are generated every year all over the world, leading to considerable costs for the oil companies in connection with its handling, transportation and cleaning. The cleaning implies the removal of oil from the solid matter so that the oil can be re-used for the drilling operations and the solid matter can be deposited as inert waste or be used as a filling material or such like.

Because of the oil content in the cuttings that come back from the drilling well, the cuttings cannot be deposited freely in nature, and the oil must thus be removed from the cuttings to ensure an environmentally friendly depositing.

In particular, it is the fraction of the drilling sludge that contains fine grains which causes the problems. The fraction containing coarse grains is sieved out on vibrating sieves and can be washed before it is dumped, or the oil remains can be evaporated off.

The finely grained fraction that comes from the vibrating sieves or the washing process is normally treated in centrifuges or hydro-cyclones, in which one obtains that a portion of the oil and water are separated from the sludge.

The remaining part of the oil is strongly bound to the sludge, and there are no sufficiently satisfactory methods present to separate this oil from the remaining sludge.

Conventional processing facilities for this type of waste are based on indirect heating. This means that the cuttings are in contact with heating surfaces that are heated by means of, for example, hot oil or flue gas. Several processes based on indirect heating are used extensively in exclusively land-based installations.

Among hot oil devices one can mention "CLTU" which is supplied by Soil Recovery Ltd in Denmark and "Thermal-D™" which is marketed by Oiltools International. The CLTU process is a so-called dish-drier in which the material is heated up by a rotor comprising dishes filled with hot oil.

The Thermal-D™ devices are so-called "paddle-driers" in which the rotor comprises special agitator bodies filled with hot oil. In both these devices the rotor has the additional function of providing slow transport of the material through the machine.

During its passage through the process, the material will be gradually heated up so that, because of the different boiling points, water which the material may contain will evaporate first and thereafter the different oil fractions. Typical boiling point distribution for common base oils which are used in drilling fluids lies in the range from 180-200° C. to 280-340° C. Because of the limited application temperature for conventional hot oils, the maximum temperature that the material can be exposed to in these processes will lie at around 280-300° C., and leads in many cases to insufficient evaporation of the oil in the material, if necessary the processing capacity may be reduced by using a longer residence time for the material so that one achieves approximately the same temperatures in the material as in the hot oil.

Processes heated with flue gas often comprise large rotating drums through which the material is slowly transported and simultaneously heated by hot flue gas from the combustion of oil or gas at the outside of the drum. The devices can have different agitation arrangements on the inside to improve the mixing of the material. These devices do not have the same temperature limitations as the hot oil heated processes, as the flue gas can be 800-900° C. However, this technology results in very large installations and long residence times for the material can lead to thermal degradation of the oil which one wants to recover at the same quality as the original. Among commercially used devices, can be mentioned THOR™, which is marketed by VARCO International and the ITD process from OnSite™ Technology.

Furthermore, known within the prior art, is means which uses the friction principle to generate sufficient energy for the oil fractions to be evaporated off. This principle is described in the applicant's own patent NO 155832. In this process a hammer mill with swinging rotor arms, as well as fins in the stator, are used to finely crush all particles in the material which one wishes to evaporate. This results in the heat which is generated ensuring evaporation of the oil in the material at a lower temperature than at normal evaporation. With this process one breaks down the capillary forces between the oil component and solid particles. The fine crushing of the material releases energy, and one will not need to supply the excess heat which normally is required to force out the liquid which is bound in capillaries.

However, this process has limitations and with the present invention one aims to provide a process which is a considerable improvement.

The extensive crushing of the sludge material is one of the disadvantages one experiences with the process described in NO 155.832. This fine crushing of the sludge material leads to a large part of the particles becoming so small that they cannot be effectively retained in the processing chamber, but are dragged out with the fluid vapour. Furthermore, the particles become so small that it is difficult, nearly impossible to separate them out with the methods for gas phase separation that can be used with high temperature oil vapour. The particles will thereby be transferred to the condensation facility for this process and end up in the condensed liquid phases. This reduces the utilitarian value of the process considerably because the aim is to reclaim the phases as purely as possible.

Another limitation with the process described in NO 155.832 is the construction with fins in the stator. This leads to much wear and tear both on the rotor arms and the fins, and even with the best available materials for hard covering we have experienced that the maintenance intervals become too short.

The present invention is essentially much different from the method described in NO 155.832 in that one is not dependent on breaking down the capillary forces, and that one thus can avoid the unnecessary crushing of the material. This is achieved by the stator having a smooth inner wall, and by having the rotor arms permanently fixed to limit any swing movements that can promote crushing.

It is thus surprisingly found that with these changes one will still be able to evaporate oils considerably below their normal atmospheric boiling points. Without being tied to a definite theory, it is assumed that the mechanism which can explain the process according to the invention is an effective so-called "steam stripping". With this is meant evaporation of a first component at a temperature substantially below the normal atmospheric boiling point in that the partial pressure in the gas phase of the first component is reduced by adding a component, or by an already present second component. The first component is typically one or several various oils, but the second component is typically water vapour.

For example, if one has a first component with a boiling point of 300° C. at normal atmospheric pressure and 250° C. at 0.1 atmospheres, one can by steam stripping evaporate this first component in a container at atmospheric pressure and 250° C. To do this, the container must be supplied with an amount of water vapour (the second component) which takes up 90% of the volume of vapour that comes out of the container. Thereby the gas volume of this component will be 10% and the corresponding partial pressure 0.1 atmospheres.

To get the full effect of steam striping it is necessary for the first and the second component to be so different that one does not get any molecular interaction between the two components. In separation of oil from oil-containing sludge and by application of water as the second component these conditions are met.

At separation of a first component from a sludge material, one can also in principle add a second component so that the steam stripping conditions are met, to get the first component evaporated at a temperature considerably below the atmospheric boiling point of the component.

As mentioned above, the process according to the invention is tested on different oil-containing cuttings, and this material contains sufficient amounts of water for it not to be necessary to add more water for the principle to function.

A presently preferred embodiment of the present invention utilises the water which is already present together with the oil in the cuttings to provide a stream stripping effect.

Drilling waste does rarely have a water/oil ratio which is less than 1:2 based on mass. Typical base oils which are used in drilling fluids encompass paraffin oils with a carbon chain length of minimum $C_{11}$ to maximum $C_{23}$ with an average of $C_{16}$. Thus, the average molecular weight of the oil is 216 g/mol, in contrast to 18 g/mol for the water. With a mass ratio of 1:2 the volume fraction of oil vapour when all water and oil have evaporated will then be=$(2/216)/(1/18+2/216)=14\%$. This means that at a working pressure of, for example, 1.2 atmospheres, the average partial pressure of oil vapour in the processing chamber will be 0.17 atmospheres. At such pressure one will have a boiling point reduction for the oil of around 50° C., which implies a considerable reduction in the necessary processing temperature to achieve complete evaporation of oil from the material. Most base oils used in drilling fluids will be completely evaporated at around 300° C., which is in a range where unwanted thermal degradation processes do not dominate, and in a range in which it is reasonably straightforward to design systems which satisfy the specific safety demands for operation of offshore installations.

Thus, with the process according to the present invention, one obtains that the evaporation will take place nearly instantaneously in an approximately homogenously mixed container with very strong agitation.

This leads to a substantial improvement of the existing technology for drying of oil-containing sludge materials.

Although the process described in NO 155.832 is the technology which is technically closest to the process according to the invention, this has as mentioned limitations with respect to finely crushed particles that it has not found widespread application. When considering the advantages which are obtained with the present invention, the invention must be compared with the indirect driers which are presently used for separation of such oil-containing sludge material.

In contrast to the slowly rotating indirectly heated processes, the process according to the present invention, because of the frictional heat that is generated and because of the material not being finely crushed, makes it possible to utilise steam stripping by using the water that is present in the material.

If one considers a slowly rotating indirect process, different defined phases will dominate at different places along the longitudinal axis of the process:

1. Preheating phase: The first part of the process where all the heat which is supplied is used to raise the temperature of the material.
2. Water evaporation phase: When the material is heated to the boiling point of water, most of the supplied energy will be used to evaporate free water.
3. New preheating phase: When the free water has disappeared, the supplied energy is used to increase the temperature to the boiling point of the lightest oil components and bound water.
4. Oil evaporation phase: As gradually heavier oil fractions are evaporated the temperature will progressively rise. Maximum temperature at the end of the process is decisive for how much oil is left in the material. For steam liberated in phase 2 to be available for steam stripping of oil in phase 4, the steam must effectively be brought into contact with the material that is in phase 4. In the solutions that are known within the prior art, it is difficult to promote such contact. To a large extent the steam will pass over the material on its way to the exit for exhaust vapour without an effective mixing between steam and material.

The present invention also provides a means that is designed for effectively carrying out the process according to the invention. This means will now be described in more detail with reference to the enclosed figures, in which.

Figure 1:
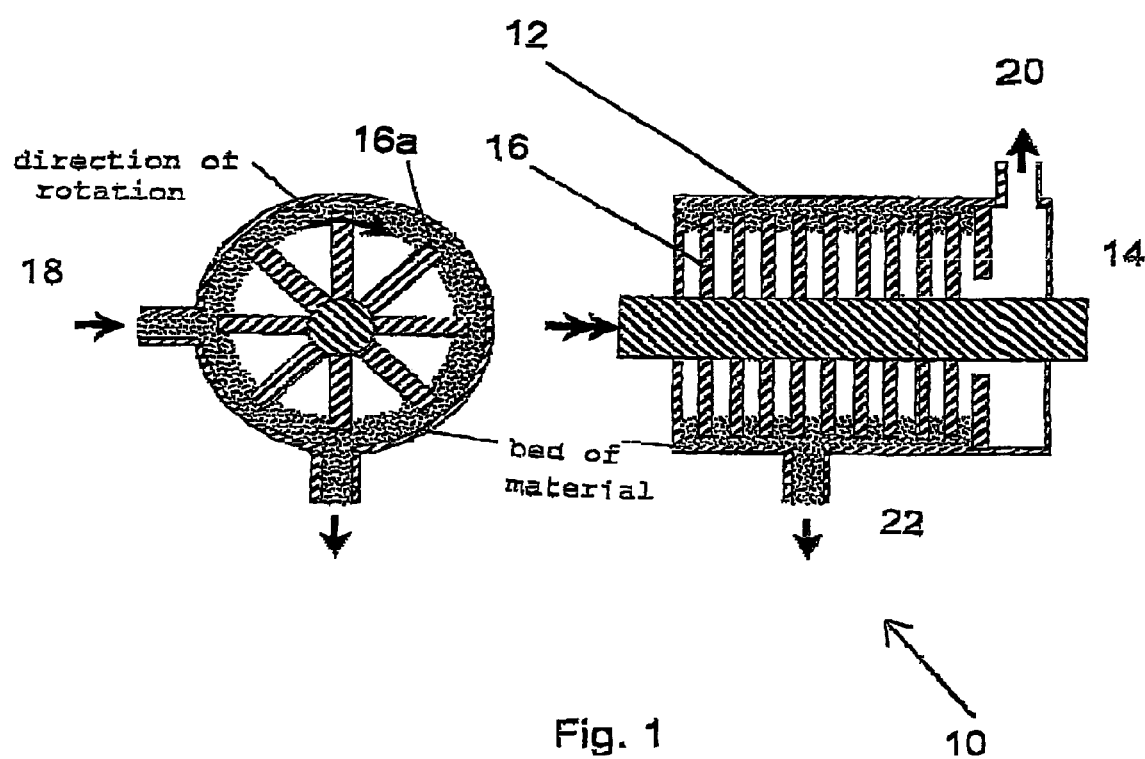
FIG. 1 shows a principle drawing of a drying means according to the invention.
Figure 2:
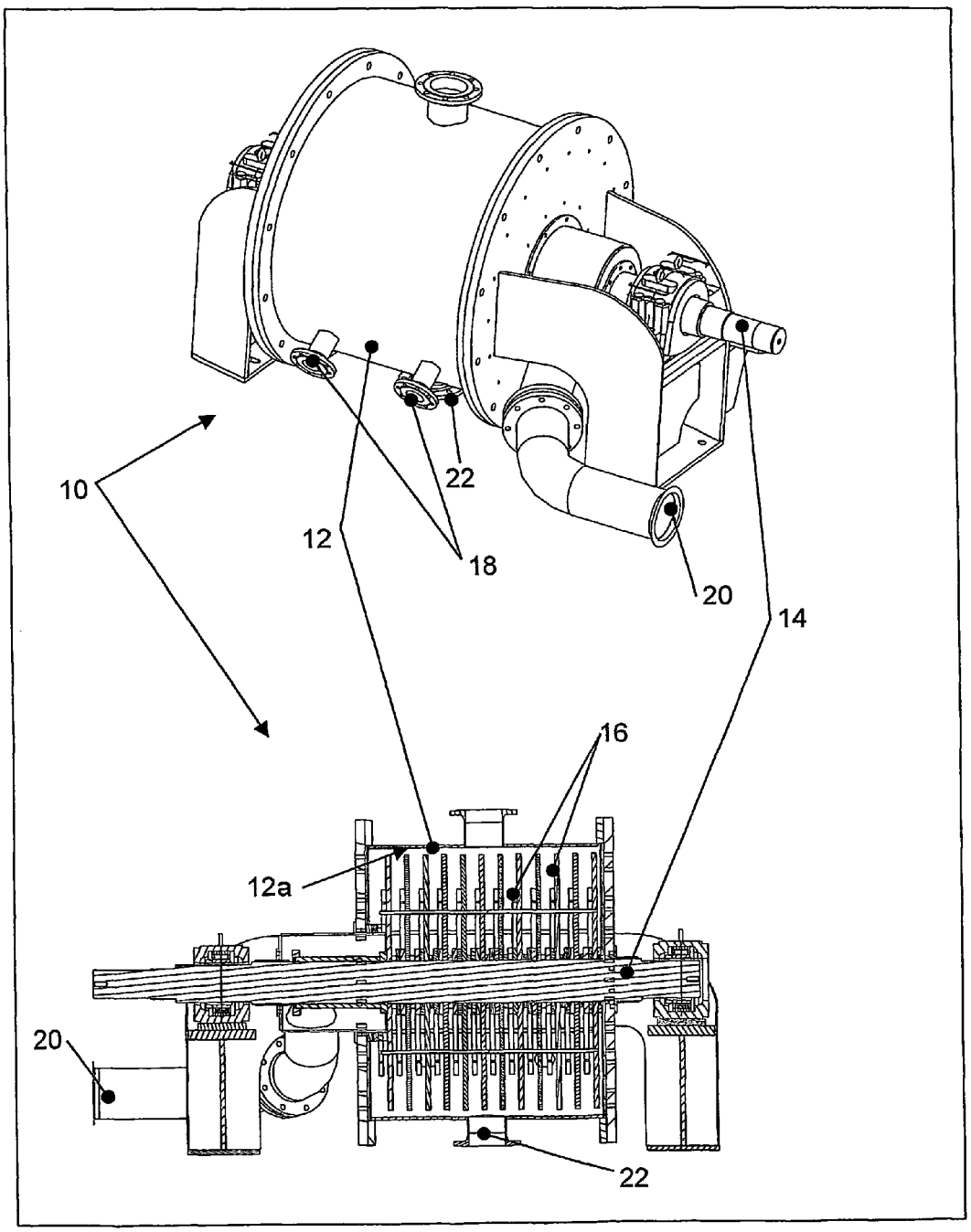
FIG. 2 shows as section and segment an embodiment of a means according to the invention.

Briefly, the invention provides a process for separation of at least a first component, e.g. oil, and a second component, e.g. water, from a mixture such as sludge. The process includes a step of directing a sludge mixture containing at least oil, water and material particles into a rapidly rotating friction dryer, in particular, into a dryer having a cylindrical chamber with a smooth inner surface and a rotating rotor having a plurality of fixed rotor arms extending into closely spaced relation to the inner surface of the chamber.

In accordance with the invention, the rotor is rapidly rotated to form an annular bed of the sludge material against the inner surface of the chamber while moving the material particles in the sludge mixture axially and tangentially and while frictionally generating heat in the annular bed of sludge material between the rotor arms and the sludge material sufficient to evaporate the water in the sludge material to steam. At the same time, the oil in the mixture is heated by the steam and evaporated at a temperature below the normal atmospheric boiling point of the oil. Thereafter, the evaporated oil and the steam are removed from the chamber separately from the material particles remaining in bed.

Further embodiments of the means are described in the subclaims 9-20.

Thus, the present invention also relates to a drying means (10). In practice, the means (10) is shaped as a cylindrical processing chamber (12) (stator) with an internally mounted rotor (14). The rotor (14) is equipped with a number of rotor arms (16) which end a short distance inside the static cylindrical container (12).

In the most common types of materials which one wishes to dry, and with rotor arms (16) made from conventional steel alloys, one can give the following characteristics for construction of the drying means (10):

1. Diameter of cylindrical processing chamber: 0.5-5 m, typically around 1 m.
2. Tangential velocity of the tip of the rotor arms: 10-100 m/s, typically around 35 m/s.
3. Radial clearance between the wall of the processing chamber and rotor: 0-0.1 m, typically about 0.03 m.
4. Number of rotor arms (16) in relation to area of the cylindrical inner wall of the processing chamber (12): 10-100 per $m^2$, typically about 30 per $m^2$.
5. Total projected front area (16a) for the part of the rotor arms that is in ingress with the bed of material viewed in the direction of movement in relation to the total volume of the bed of material: 0.1-1 $m^2/m^3$, typically about 0.5 $m^2/m^3$.

The length of the processing chamber (12) and the dimensions of the rotor arms (16) in tangential direction is of less importance for the processing. The directions for these will be given by the mechanical strains the construction must withstand, and the demands for effective removal of the steam that is generated in the material bed. By increasing the tangential velocity, one gets considerable possibilities for varying the different parameters defined above.

The essential of the drying means (10) is that this is formed so that the three basic physical processes of mixing, generation of heat and evaporation are in correct relation to each other. To obtain sufficient generation of heat by means of forces of internal collisions, contacting and friction, it is necessary to have high tangential velocities of the rotor arms (16) as indicated in item 2 above. The number of rotor arms (16) must not be too high, and the arms (16) must not be placed too close as this can lead to the material in the bed to a large extent rotating together with the rotor, more or less like a solid body. The forces of friction will then mainly arise between the bed of material and the wall of the cylindrical container (12). This will result in too low heat generation to obtain effective evaporation. Furthermore, the mixing process will be ineffective, and it will be impossible to maintain a stable and dry bed of material. The other extreme, namely the distance between the rotor arms (16) being too large, is not good either. Then, not enough of the bed material will participate in the energy transfer mechanism that is described above, which will lead to both ineffective mixing and too little evaporation. The result is that local zones with too high moisture content will arise.

Good results are obtained with the combination of parameters as are given in items 3-5, and a presently preferred embodiment of the invention is means (10) with the following characteristics:

1. Diameter of cylindrical processing chamber is around 1 m.
2. Tangential velocity of the end of the rotor arms lies in the range 30-40 m/s, preferably around 35 m/s.
3. Radial clearance between wall (12a) of the processing chamber (12) and the front area (16a) of the rotor arm (16) is about 0.03 m.
4. Number of rotor arms (16) in relation to the area of the inner wall of the cylindrical processing chamber is 30 per $m^2$.
5. Total projected front area (16a) for the part of the rotor arms which is in ingress with the bed of material viewed in the direction of movement in relation to the total volume of the bed of material is about 0.5 $m^2/m^3$.

A sufficiently rapid mixing is important. With the typical combination of tangential velocity, clearance and diameter as indicated in items 1-3 above, the individual particles in the bed of material will be able to move round the whole circumference of the bed of material about 12 times per second. This will give a mixing in the tangential direction which is very rapid and effective. One will not find gradients in the oil content in a tangential direction in such a device, apart from in the area immediately downstream from the feeding points. In an axial direction on the other hand, the mixing time will be somewhat longer, as the mixing mechanism is more indirect than in the tangential direction. This can mean that one can find gradients in the oil content in the axial direction with maximum values in the axial positions where feeding takes place. To succeed with the processing it is essential that feeding is regulated so that the average oil content around the whole circumference at the feeding points are adjusted so that the demands for remaining oil content in the dry material is met. A smoother distribution of feeding point in an axial direction will render the process less dependent of an effective axial mixing, and an embodiment according to the invention thus relates to a means (10) where several feeding points are arranged along the axial direction of the means (10).

To create the necessary heat generation, the demand for effective mixing must be met at the same time. The rotor arms (16) will mainly ensure that the particles in the bed material are thrown in a tangential direction, but movements of less systematic nature are also generated in an axial direction, ensuring axial mixing in the bed of material. This helps to collect the bed of material along the inner wall of the cylindrical container (12) with forces which greatly exceed the tendency of the force of gravity to collect material in the bottom of the container (12). The pulling forces from the vapour that is generated in the bed of material are not strong enough to transport substantial amounts of material towards the centre of the container either. Therefore, the exhaust vapour is led out from the processing/drying chamber itself via an exit (20) situated as centrally as possible. This contributes to reducing the pulling along of particles in the exhaust vapour to an acceptable level.

If one compares the means according to the invention to the solution that is closest technically, i.e. the means which is described in NO 155.832, then the main differences are that the means according to the present invention firstly is not equipped with longitudinal wearing fins, and secondly, there is no impact arms mounted on the rotor plates.

Furthermore, the embodiment which is outlined in NO 155.832 has an inlet opening for material in the one end-wall and exit for dry material in the other. This leads to the contact between steam which is formed in the first part of the process and particles in phase 4 in the last part of the process being much poorer than in a homogeneously mixed container, because there will be an even flow of oil vapour from material in phase 4 towards the gas volume within the bed of material which prevents steam from coming in contact with, and be mixed with, the particles.

With the means according to the present invention the individual particles that are fed in will very quickly be spread over the whole of the bed of material in the processing chamber due to the positioning of the feeding opening(s) and the construction of the apparatus. Each individual particle will go through the four phases indicated above, but the intensive mixing will ensure that there will be particles in all the four phases throughout the whole of the bed of material all the time. If one considers a given number of particles, the gas that surrounds the particles in the bed will have the same mixing ratio between water vapour and oil vapour throughout, and this must be given by the amount of water and oil in the material. Around every particle in a fluidised bed there will be a laminar boundary layer of a given thickness. Molecules that are evaporated from the surface of the particle must diffuse through this boundary layer to get to the turbulent homogeneously mixed gas phase outside, and the thickness of the boundary layer is decisive for the concentration gradient which sets the rate of diffusion and thereby the rate of evaporation. As long as the partial pressure of the oil in the homogeneous bulk gas phase is below the vapour pressure at the prevailing temperature, the oil molecules will diffuse through the laminar boundary layer and into the gas phase. The thinner the boundary layer, the more effective the stream stripping of oil from a particle that is in phase 4 will be. The high rotational speed which is necessary to keep the material in the processing chamber homogeneously mixed gives at the same time also a much effective reduction in the thickness of the laminar boundary layer.

The invention claimed is:

1. A separation process comprising the steps of
directing a mixture containing at least a first component, a second component and material particles into a cylindrical chamber having a smooth inner surface and a rotating rotor having a plurality of fixed rotor arms;
rapidly rotating said rotor to form an annular bed of the mixture against said inner surface while frictionally generating heat in said annular bed sufficient to evaporate the second component in said bed;
simultaneously evaporating said first component in said bed with said second component at a temperature below the normal atmospheric boiling point of said first component; and
thereafter removing at least the evaporated first component from said chamber separately from the material remaining in said bed.

2. A process as set forth in claim 1 wherein said first component is oil.

3. A process as set forth in claim 2 wherein said second component is water.

4. A process as set forth in claim 3 further comprising the step of adding water to said mixture prior to directing said mixture into said chamber.

5. A process as set forth in claim 1 wherein said second component is water.

6. A process as set forth in claim 5 further comprising the step of adding water to said mixture prior to directing said mixture into said chamber.

7. A process as set forth in claim 1 wherein said rotor arms have a tangential velocity at respective ends thereof in the range of from 10 to 100 meters per second.

8. A process as set forth in claim 1 wherein said first component is an oil containing material.

9. A process as set forth in claim 1 wherein said mixture is a drilling waste mixture, said first component is an oil and said second component is water.

10. A process as set forth in claim 9 wherein said oil is a paraffin oil with a carbon chain, length of from $C_{11}$ to $C_{23}$.

11. A process as set forth in claim 9 wherein said oil has a boiling point of 300° C.

* * * * *